United States Patent Office 3,525,675
Patented Aug. 25, 1970

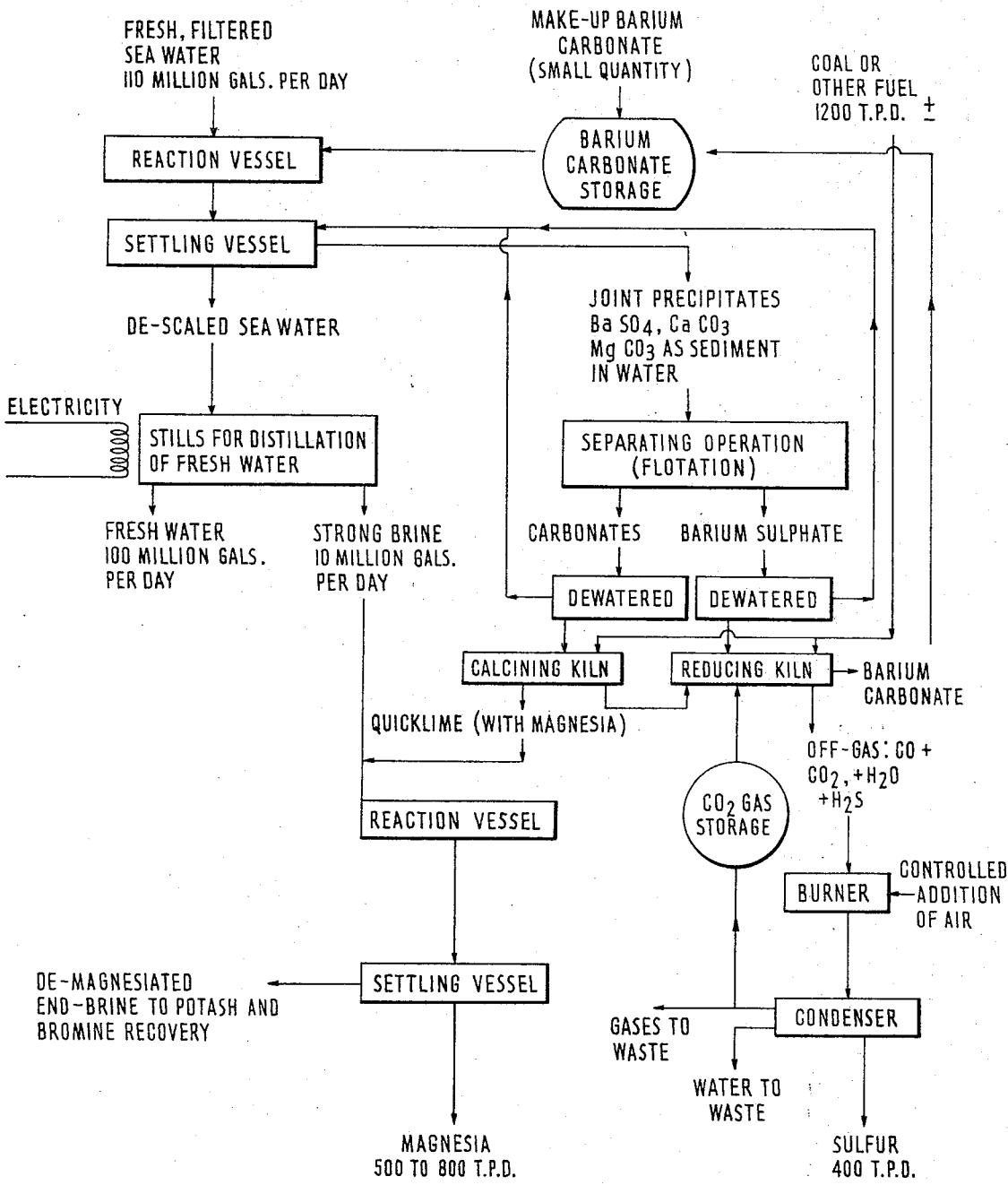

1

3,525,675
DESALINATION DISTILLATION USING BARIUM CARBONATE AS DESCALING AGENT
Antoine M. Gaudin, Newtonville, Mass., assignor, by mesne assignments, to Orca, Inc., Cambridge, Mass., a corporation of Massachusetts
Filed May 22, 1968, Ser. No. 731,196
Int. Cl. B01d 3/02; C02d 5/02
U.S. Cl. 203—7
6 Claims

ABSTRACT OF THE DISCLOSURE

A method of desalinating sea water comprises descaling the sea water with barium carbonate to form and remove scale-forming components as precipitates. The precipitates are then treated to reform barium carbonate therefrom which can be recycled and reused with additional sea water. The precipitates are preferably treated to separate insoluble carbonates from insoluble sulfates after which barium sulfate is reduced to form barium carbonate. Additional steps in the process permit economic recovery of fresh water along with commercially usable byproducts having substantial commercial value.

BACKGROUND OF THE INVENTION

In the past, many methods have been suggested for desalinating sea water with the distillation method being among the oldest as well as the simplest method of obtaining fresh water from sea water. As is known, simple distillation where steam is generated and then condensed to form fresh water has serious drawbacks. For example, corrosion of heat transferring surfaces in the distillation apparatus often occurs as does large scale formations which tend to clog and obstruct distillation apparatus. Often the apparatus has short lifetimes and must be frequently disassembled and cleaned because of the corrosion and scale-forming problems.

Scale and corrosion often result because of the retrograde solubility properties of salts present in the sea water. Such salts are less soluble as temperature increases as during heating in the process of distillation. Such salts include salts of calcium and magnesium, calcium and magnesium being the principal scale-forming positive ions.

SUMMARY OF THE INVENTION

In accordance with this invention, barium carbonate is used as a cyclic descaling agent and regenerated in a descaling and distilling process of producing fresh water from sea water. Barium carbonate is admixed with sea water to form barium sulfate, calcium carbonate, and magnesium carbonate which are removed as precipitates. The precipitates are then treated to reform barium carbonate therefrom which can be recycled and used again. The descaled sea water is then distilled in a conventional steam distilling apparatus to obtain fresh water. Preferably, the precipitates are treated by separating the carbonates from the barium sulfate as by a flotation method. The barium sulfate is then preferably reduced to form barium carbonate.

The overall process is extremely advantageous from a commercial point of view because of the possibility of obtaining valuable commercial byproducts such as sulfur, magnesia, useful gases, and regenerated barium carbonate in amounts close to that required to form the original precipitates. Moreover, contamination of the distilling apparatus is avoided.

2

BRIEF DESCRIPTION OF THE DRAWING

The overall process of descaling sea water in a desalinating process is shown in the diagrammatic flow sheet of the single figure of the drawing.

DESCRIPTION OF PREFERRED EMBODIMENTS

It is known that sea water normally contains, among other ions, $Ca^{++}$, $Mg^{++}$, $K^+$, $Na^+$, $H^+$, $OH^-$, $HCO_3^-$, $SO_4^=$, $Cl^-$, $Br^-$, which are soluble in the sea water. When barium carbonate is added to sea water in at least an amount equal to the stoichiometric amount required to precipitate all of the sulfate ion in the sea water, the following reaction takes place:

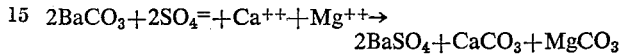

The above reaction proceeds rapidly very far in the direction of the arrow at normal atmospheric temperatures ranging from 50 to 80° F.

A joint precipitate formed by the reaction includes barium sulfate, calcium carbonate, and magnesium carbonate. As shown in the flow sheet of the drawing, barium carbonate is added to the reaction vessel. A suitable settling vessel is provided as is known in the art. After thorough mixing of the barium carbonate with the sea water, the charge is passed to the settling vessel and the joint precipitate settles in the settling vessel in a relatively thick suspension of from 20 to 30% by weight solids and can be removed by conventional methods as by drawing off from the bottom of the settling vessel during batch reactions. The particular size of each batch is limited only by the type of equipment available. Preferably, the barium carbonate used is in finely divided powdered form and homogeneously mixed with sea water in the reaction vessel. For example, a finely ground barium carbonate can be added to the reaction vessel which may comprise a batch of 100 gallons and agitated for a period of 1 hour, after which the reaction mixture is passed to the settling vessel and the precipitate allowed to settle for a period of 2 hours.

After removal of the precipitate as by the use of a thickener of merely tapping the bottom of the settling vessel and drawing off the thick suspension of the precipitate, the remaining sea water, containing a large percentage of sodium chloride and a depleted small amount of magnesium, is passed to a conventional steam distillation apparatus. Because of the large reduction in scale-forming components, the temperature range employed in the still can be extended and the extent of concentration of end brine can be increased thereby substantially increasing thermal efficiency of the distilling process which can be carried out for example at temperatures in the range of from 215 to 230° F. for periods of time of from 5 min. to 30 min. The remaining strong brine in the distillation apparatus which may amount to as much as 10 million gallons per day when 110 million gallons are treated is then reacted with quicklime in a second reaction vessel as shown on the flow sheet. After reaction in the second reaction vessel, caused by mixing of the quicklime with the strong brine, the reaction mixture is passed to a settling vessel where demagnesiated end brine is passed to a potash and bromine recovery apparatus or may be discarded. The precipitate in the settling vessel comprises magnesia in substantially pure form and as much as 500 to 800 t.p.d. can be recovered.

A significant part of the invention comprises the steps of regenerating calcium carbonate from the joint precipitate formed by the use of descaling agent on raw sea water. This is done by first separting barium sulfate from the associated carbonates of calcium and magnesium formed in the joint precipitate.

The barium sulfate can be separated by a conventional flotation separation procedure or any other desired separating operation. As shown on the flow sheet, the calcium and magnesium carbonates obtained are then dewatered as by passage through a filter with the water being passed back to the settling tank and the carbonates passed to a conventional calcining kiln to obtain quicklime with magnesia for use in treating the strong brine.

The barium sulfate is dewatered with the water passed back to the settling vessel and the remainder of the barium sulfate passed to a reducing kiln furnaced with coal, coke or some other reducing fuel. This is a traditional way of producing barium sulfide from barium sulfate; however, by proper manipulation of conditions, a carbonate can be produced in a single step or if required, in two steps. Hydrogen sulfide is evolved along with other off gases such as carbon monoxide, carbon dioxide and water which are in turn passed to a burner and burned with the final product being passed to a condenser where sulfur is precipitated in an amount of about 400 t.p.d. for each 110 million gallons of sea water as indicated on the flow sheet. Water in the condenser is passed to waste and waste gases are evolved. Carbon dioxide gas from the condenser can be passed to a carbon dioxide gas storage and then to the reducing kiln as is carbon dioxide gas evolved from the conventional calcining kiln.

Sufficient barium carbonate can be produced and passed to a barium carbonate storage vessel for subsequent reuse in the reaction vessel as indicated by the flow chart.

The end brine available from the distillation step can be used to advantage as a feed material for the production of sodium chloride by further evaporation or for the production of potassium compounds, bromine, sodium hydroxide and chlorine by electrolysis or other known means. Approximately 300 tons of potassium chloride and 30 tons of bromine can be obtained by further processing of this end brine.

While a batch process has been described, by the use of separate reaction and settling vessels, the entire distillation and separation of valuable materials can be carried out substantially continuously, thus, the time needed for reaction of the sea water and barium carbonate permits subsequent steps to be carried out while each new charge is reacting in the reaction vessel.

In a specific example of the method of this invention, a sample of sea water from the Atlantic Ocean is obtained having a total salinity of 3.40%. The composition of the salts, calculated as specific anhydrous salts, is as follows:

| | Percent |
|---|---|
| NaCl | 77.8 |
| MgCl$_2$ | 10.9 |
| MgSO$_4$ | 4.7 |
| CaSO$_4$ | 3.6 |
| K$_2$SO$_4$ | 2.5 |
| Remainder (undetermined) | 0.5 |
| Total salts | 100.0 |

Expressing the sulfate radical on a fractional basis of the total fluid, $$(SO_4) = (0.0340)\left[\frac{96}{96+24}(0.047) + \frac{96}{96+40}(0.036) + \frac{96}{96+78}(0.025)\right] = 0.0340 \times (0.0376 + 0.0254 + 0.0138) = .002611$$

Thus, approximately, SO$_4$ equals 0.261%. It represents a concentration of 2.69 millimol of sulfate per liter.

The theoretical quantity of barium carbonate required to react stoichiometrically with this quantity of sulfate is 2.69 millimol of barium carbonate per liter or $(137.3+12.0+48.0) \times 0.00269 = 5.307$ grams per liter.

To allow for impurities in the barium carbonate used, 5.5 grams BaCO$_3$ are added to one liter of sea water. The barium carbonate is made into a fine suspension in a part of the sea water, being ground with it first in a mortar with a pestle. The barium carbonate, so suspended in sea water is then poured into a large beaker, made up to a liter with additional sea water, and gently agitated with a stirrer for about one hour. At the end of the agitation period, the white suspension is allowed to settle for a period of two hours. At the end of this settling period, the clear liquid is siphoned off to provide the descaled sea water for the production of fresh water. The clear liquid is distilled in a steam distillation apparatus to obtain 900 ml. of distilled pure water.

The clear liquid can be further clarified before distillation by filtration and analyzed for sulfate content. This is found to be less than 5 parts sulfate per million as compared with the content of incoming sea water of 0.261% or 2610 parts sulfate per million.

In a second example, the above example is repeated on a ten-fold increased scale, using a large bucket-shaped vessel for reaction and settling. The barium carbonate here consists of 60 grams, and the sediment at the end of the settling period is contained in approximately 900 ml. of descaled water. This is filtered to produce a filter cake of mixed barium sulfate, calcium carbonate, magnesium carbonate and residual barium carbonate and an additional volume of descaled water of approximately 830 ml. The descaled water can be distilled in a conventional steam distillation apparatus.

The mixed filter cake containing about 80 grams of solids is then separated by flotation using as reagents, rated on the basis of pounds of agent per ton of solids: dodecylammonium chloride, 0.8 lb. per ton and pine oil, 0.05 lb. per ton. The separation is made in a small laboratory-size machine of the agitation type. The float, weighing 57 grams, dry weight, contains principally barium sulfate and is used as feed for the reducing kiln.

To illustrate the reducing step, a charge of 1 kilogram of barium sulfate is mixed with 120 grams of finely ground coke breeze and placed in a muffle furnace, used as a reducing kiln. This is a gas-fired muffle furnace, and provision is devised to permit the flow of carbon dioxide and of steam when desired. In the first part of the kiln treatment, heating to a temperature of from 900 to 1200° C. is practiced. This results in reduction of the barium sulfate by the carbon of the coke:

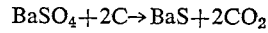
$$BaSO_4 + 2C \rightarrow BaS + 2CO_2$$

The quantity of coke used is a slight excess over the quantity necessary.

In the second part of the kiln treatment, superheated steam is allowed to flow over the material that is in the ceramic boat in the kiln, mixed with a relatively small proportion of carbon dioxide. The flushing action of this flow of steam is probably responsible for the hydrolysis of the barium sulfide, and for the reaction with carbon dioxide to produce barium carbonate:

$$BaS + 2H_2O \rightarrow Ba(OH)_2 + H_2S\uparrow$$

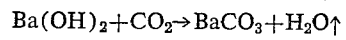
$$Ba(OH)_2 + CO_2 \rightarrow BaCO_3 + H_2O\uparrow$$

The roasting of barium sulfate is an old art in which it is generally aimed to produce barium sulfide, and in which production of barium hydroxide and barium carbonate show that undesired reactions have occurred. In the case of this invention, it is highly desirable that these supplemental reactions occur to the fullest extent.

The barium carbonate obtained by the heat processing is of suitable quantity provided the charge was rabbled or otherwise moved during the heat processing, so as to expose new surfaces to the action of the gases.

While specific embodiments of the present invention have been shown and described, it should be understood that many variations thereof are possible. In all cases, a key point in the present invention is the reformation of barium carbonate in amounts substantially as large as the original barium carbonate formed so as to greatly reduce costs in the process of the invention.

In view of the many modifications possible, this invention is to be limited only by the spirit and scope of the appended claims.

What is claimed is:

1. In a method of desalinating sea water comprising descaling said sea water and distilling said sea water, the improvement comprising,
   admixing said seat water with barium carbonate to form barium sulfate, calcium carbonate and magnesium carbonate as a joint precipitate from said sea water,
   separating said precipitate from said sea water,
   and treating said precipitate to reform barium carbonate therefrom, said precipitate being treated by separating said carbonates from said barium sulfate, subsequently reducing said barium sulfate to form barium carbonate, and recycling said so formed barium carbonate to a tank containing sea water whereupon said admixing and separating steps can be repeated.

2. The improvement of claim 1 wherein said barium sulfate is reduced by carbon in the presence of steam.

3. The improvement of claim 2 wherein said reducing step is carried out at a temperature in the range of from 900 to 1200° C.

4. The improvement of claim 1 wherein said magnesium and calcium carbonates are calcined to form quicklime.

5. A method of desalinating sea water comprising,
   treating said sea water with barium carbonate to form barium sulfate, calcium carbonate and magnesium carbonate as a joint precipitate from said sea water,
   separating said precipitate from said treated sea water by allowing the precipitate to settle and then drawing off the suspension of the precipitate,
   distilling the remaining thus treated sea water to obtain fresh water distillate,
   separating said calcium carbonate and magnesium carbonate from said barium sulfate by flotation, dewatering the barium sulfate and the calcium and magnesium carbonates by filtration,
   calcining the thus dewatered carbonates to form quicklime with magnesia,
   dewatering and reducing said barium sulfate by heating the same in a furnace with carbon to a temperature of from 900 to 1200° C. to form barium carbonate,
   recovering hydrogen sulfide from the furnace waste gas from said reducing step,
   and treating said waste gas to obtain sulfur as a condensate therefrom.

6. A method of desalinating sea water in accordance with claim 5 wherein said suspension drawn off is a thick suspension,
   said hydrogen sulfide waste gas is recovered by burning the gas and passing the resultant product to a condenser,
   and said barium sulfate is reduced to form barium sulfide which is reacted with steam and carbondioxide to form hydrogen sulfide and barium carbonate.

References Cited

UNITED STATES PATENTS

| | | | |
|---|---|---|---|
| 1,634,338 | 7/1927 | Pierce | 23—66 |
| 1,937,995 | 12/1933 | Thomsen | 23—217 |
| 2,191,411 | 2/1940 | Pierce | 23—66 X |
| 2,637,545 | 5/1953 | Hicquet | 23—66 X |
| 2,637,700 | 5/1953 | Herbert | 252—182 |
| 3,218,241 | 11/1965 | Checkovich | 203—7 |
| 3,304,155 | 2/1967 | Zirngiebl | 23—66 |
| 3,322,683 | 5/1967 | Lester | 252—313 |
| 3,402,017 | 9/1968 | Ruiz | 23—67 |
| 3,402,998 | 9/1968 | Squires | 23—181 |
| 3,432,258 | 3/1969 | Ferris | 23—91 |

FOREIGN PATENTS 1,176,109  8/1964  Germany.

NORMAN YUDKOFF, Primary Examiner

F. E. DRUMMOND, Assistant Examiner

U.S. Cl. X.R.

203—11; 252—80, 182, 313; 23—66, 122